United States Patent
Cook et al.

(10) Patent No.: US 6,308,966 B1
(45) Date of Patent: Oct. 30, 2001

(54) SKI VEHICLE BRAKE AND STEERING SYSTEM

(76) Inventors: Travis A. Cook, c/o Prairie Stage, RRT HC 84, Prairie, ID (US) 83647; Joseph L. Putney, 2306 Ray Ave., Caldwell, ID (US) 83605

( * ) Notice: Subject to any disclaimer, the term of this patent is extended or adjusted under 35 U.S.C. 154(b) by 0 days.

(21) Appl. No.: 09/452,912

(22) Filed: Dec. 1, 1999

(51) Int. Cl.[7] .............................. B62B 13/14; B60T 7/08
(52) U.S. Cl. ............................ 280/28.11; 180/183; 188/6
(58) Field of Search ................................. 280/28, 28.11; 188/6, 8; 180/180, 181, 182, 183, 184

(56) References Cited

U.S. PATENT DOCUMENTS

| | | | |
|---|---|---|---|
| 1,122,707 | * 12/1914 | Eisen | 188/6 |
| 3,711,109 | * 1/1973 | Hofbauer | 188/6 |
| 3,726,354 | * 4/1973 | LaPlante | 188/6 |
| 3,909,024 | * 9/1975 | Salomon | 188/6 |
| 4,152,007 | * 5/1979 | Smith | 188/6 |
| 5,853,061 | * 12/1998 | Yamamoto et al. | 280/28 |
| 6,102,413 | * 8/2000 | Khennache et al. | 280/28 |

* cited by examiner

*Primary Examiner*—Lanna Mai
*Assistant Examiner*—Jeff Restifo
(74) *Attorney, Agent, or Firm*—Ken J. Pedersen; Barbara S. Pedersen

(57) ABSTRACT

A braking and steering mechanism that is located near, but behind the steering pivot point of a runner of a ski vehicle. In a conventional snowmobile, for example, the steering pivot point is near the middle of the longitudinal axis of the runner, and, hence, the preferred braking and steering mechanism extends from behind the middle of the runner, but not at the rear end of the runner, to contact the snow or ground to slow or stop the snowmobile movement relative to the snow or ground. The preferred braking and steering mechanism has a brake that is a retractable, protruding member that extends down from the runner bottom surface near, but behind the steering pivot point a sufficient distance to frictionally engage the snow/ground significantly more than does the bottom of the runner. The protruding member may take the forms of a prong or spike, a blade or plate, or other single, plural, smooth or toothed member(s) that can make frictional contact with the snow/ground. Preferably, the brake has one or more elongated members that extend through and from the bottom of the runner to stab 2–6 inches into the snow/ground, provided that the center of gravity of the elongated members and their actuating mechanism combined is located near, but behind, the steering pivot point of the ski. Optionally, there may be included a control system for partial or incremental application of the brake, for example, for moving the brake varying depths into the snow/ground, or moving the brake to varying angles and positions relative to the snow/ground for varying amounts of frictional engagement or digging action. Also, there may be included a control system for differential application of the brake on one side of the ski vehicle relative to the other side. This way, assistance in steering the vehicle may also be obtained.

4 Claims, 3 Drawing Sheets

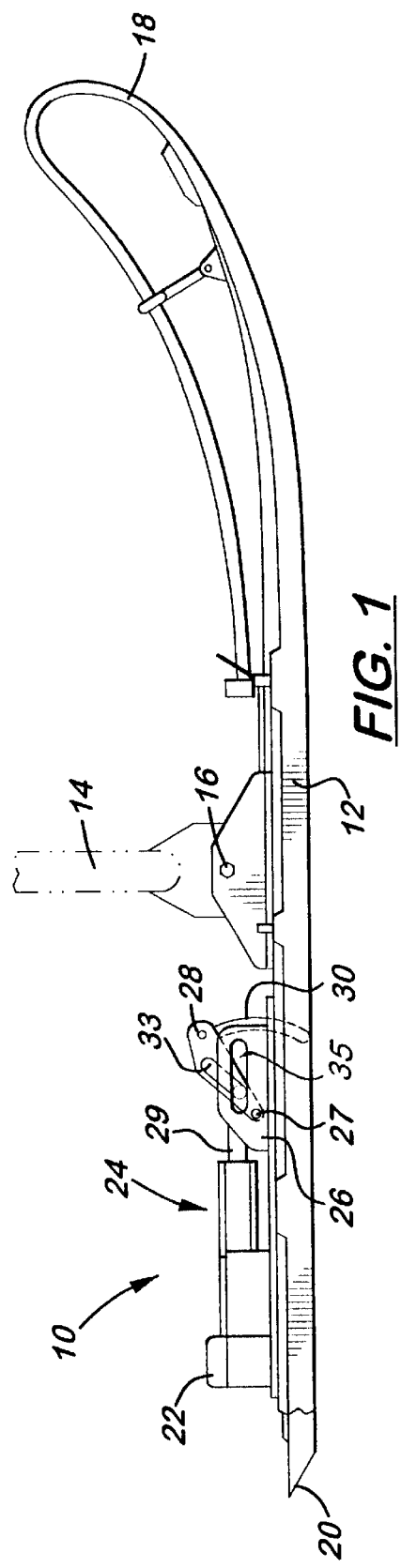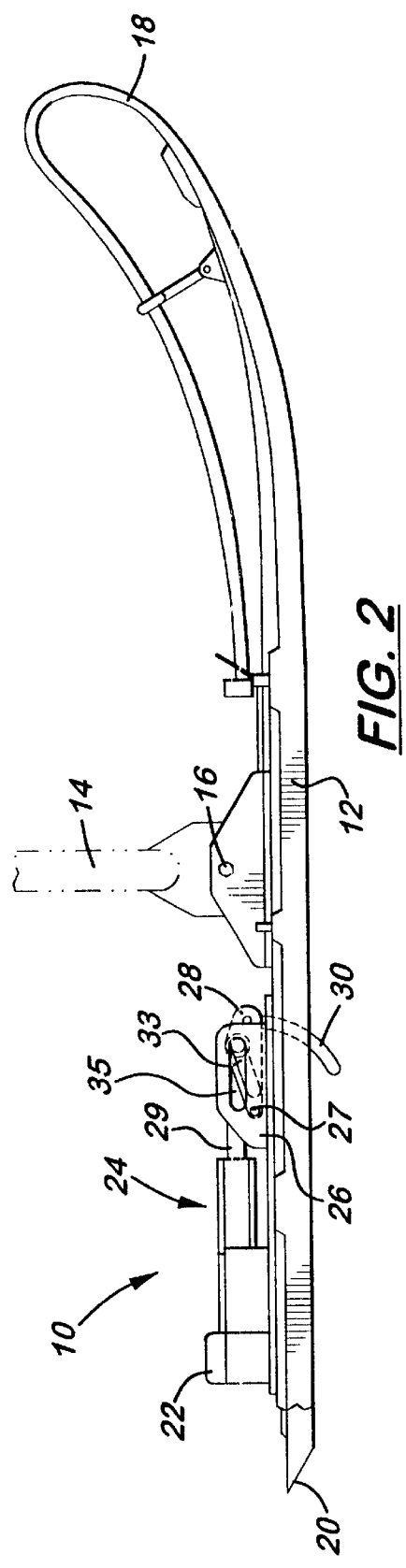

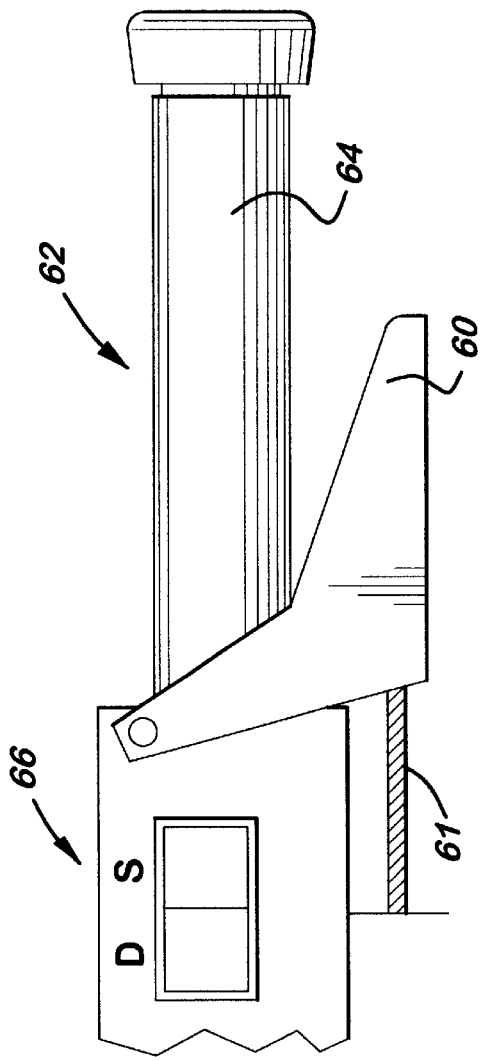
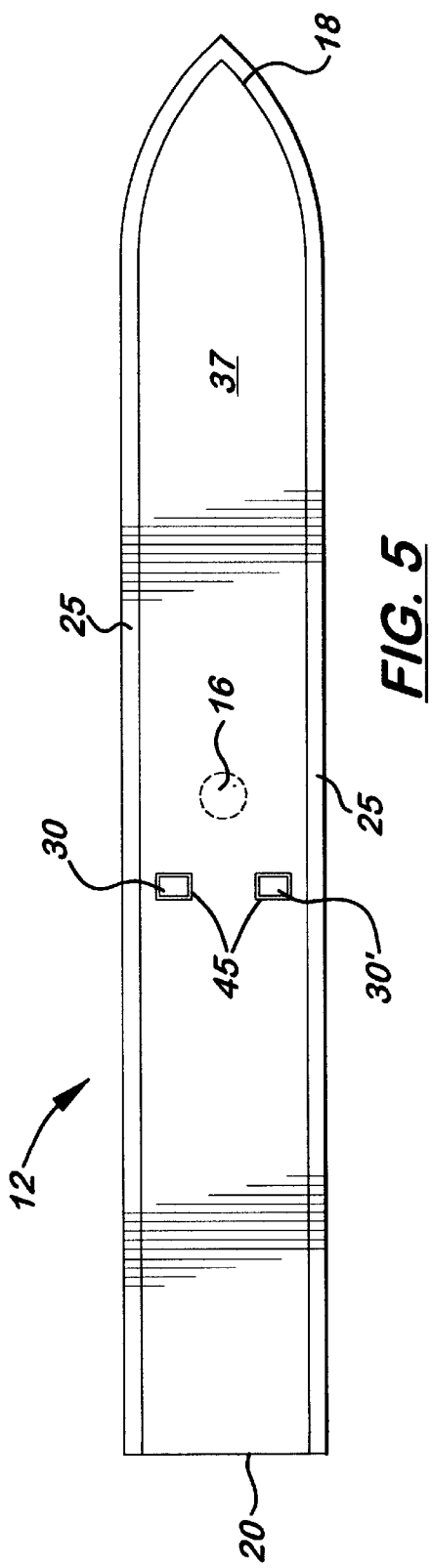

SKI VEHICLE BRAKE AND STEERING SYSTEM

BACKGROUND OF THE INVENTION

1. Field of the Invention

This invention relates, in general, to snowmobile and other ski vehicle braking and steering systems. More specifically, the invention relates to braking and steering systems that improve control of the vehicle's forward or backward motion even when the conventional braking method, that is, slowing or stopping the drive track for snowmobiles, for example, fails to adequately control the vehicle.

2. Related Art

Snowmobiles, for example, are conventionally slowed or stopped by slowing or stopping the drive track, that is, the endless belt that moves against the snow or ground to power the snowmobile. Because the drive track causes the snowmobile's movement relative to the snow/ground, the drive track is conventionally used to achieve slower movement or to stop movement of the snowmobile. Using this as the sole breaking method, however, can be ineffective and even dangerous in conditions in which the drive track's frictional contact with the snow or ground is not optimum. For example, when the drive track is "clogged" with snow, engagement of the track with the snow on the snowmobile's course is not always sufficient to quickly slow or stop the snowmobile. Or, when the snowmobile is traveling downhill or on icy terrain, the track tends not to grip the terrain adequately. Under these conditions, therefore, the track tends to slip rather than grip the terrain, and the conventional braking system is inadequate. Also, the conventional braking system provides no steering capability, and, in fact, tends to interfere with steering because it tends to lock up the drive tracks and cause skidding.

One attempt at a solution to the braking problem has been posed in the patent literature, as shown in U.S. Pat. No. 5,673,772 (Martin, Oct. 7, 1997). Martin discloses a ski-type runner system which includes a downwardly extendable flap at the rear end of each runner that may be actuated to drag into the snow. Martin teaches that the two flaps are actuated in unison so that balanced braking force is applied to each trailing ski end on both sides of the snowmobile. It is understood, however, that the rearward flap of Martin adversely effects the handling characteristics of the snowmobile during operation.

Another attempt at a solution to this braking problem in shown in U.S. Pat. No. 5,931,481 (Hoffman, Aug. 3, 1999). Hoffman discloses a snowmobile braking system with two (2) blades which are downwardly extendible from each side of the central portion of a ski. Only one of the snowmobile's two skis is equipped with the braking system. It is expected that the single-ski brake of Hoffman will also adversely affect the handling characteristics of the snowmobile during operation.

Still, an effective and safe ski vehicle braking and steering system is needed to improve handling in icy or downhill conditions, for example. Such a braking and steering system is needed that does not depreciate or interfere with handling of the ski vehicle.

SUMMARY OF THE INVENTION

The present invention comprises a braking and steering mechanism that is located near but behind the steering pivot point of a ski runner on a ski vehicle, for example, a snowmobile. In a conventional snowmobile, the steering pivot point is near the middle of the longitudinal axis of the runner, and, hence, the preferred braking and steering mechanism extends from behind the middle of the runner, but not at the rear end as in the Martin reference, to contact the snow or ground to slow or stop the snowmobile movement relative to the snow or ground. The preferred braking and steering mechanism comprises a brake that is a retractable, protruding member that extends down relative to the runner bottom surface near, but behind, the steering pivot point a sufficient distance to frictionally engage the snow/ground significantly more than does the bottom of the runner. The protruding member may take the forms of a prong or spike, a blade or plate, or other single, plural, smooth or toothed member(s) that can make frictional contact with the snow/ground. Preferably, the brake comprises one or more elongated members that extend through and from the bottom of the runner to stab 2–6 inches into the snow/ground. Alternatively, the brake may comprise one or more elongated members that extend alongside the runner to stab 2–6 inches into the snow/ground, provided that the center of gravity of the elongated members and their activating mechanism combined is located near, but behind, the steering pivot point of the ski.

The invented braking and steering system includes an actuator for applying the brake and for retracting the brake. A power screw, hydraulic piston, or other actuator may be used. Controls may be included, preferably at least an on/off system that applies the brake and then retracts the brake, respectively, in a quick and reproducible manner. Optionally, there may be included a control system for partial or incremental application of the brake, for example, for moving the brake varying depths into the snow/ground, or moving the brake to varying angles and positions relative to the snow/ground for varying amounts of frictional engagement or digging action.

Preferably, the invented brake and steering system is installed on both ski runners of the snowmobile. Also, there may be included a control system for differential application of the brake on one side of the snowmobile relative to the other side. This way, assistance in steering the snowmobile may also be obtained. Also, the brake may be controlled so that it is automatically activated when the operator falls off or steps off the vehicle.

BRIEF DESCRIPTION OF THE DRAWINGS

FIG. 1 is a schematic side view of one embodiment of the invention with the prong of the brake retracted in the "go" position.

FIG. 2 is a schematic side view of the embodiment depicted in FIG. 1 with the prong of the brake extended in the "stop" or "steer" position.

FIG. 4 is a schematic side view of one embodiment of a lever handle and mode switch for the invented braking and steering system.

FIG. 5 is a schematic partial bottom view of a ski runner adapted for one embodiment of the invented braking and steering system.

DESCRIPTION OF THE PREFERRED EMBODIMENTS

Figure 3:
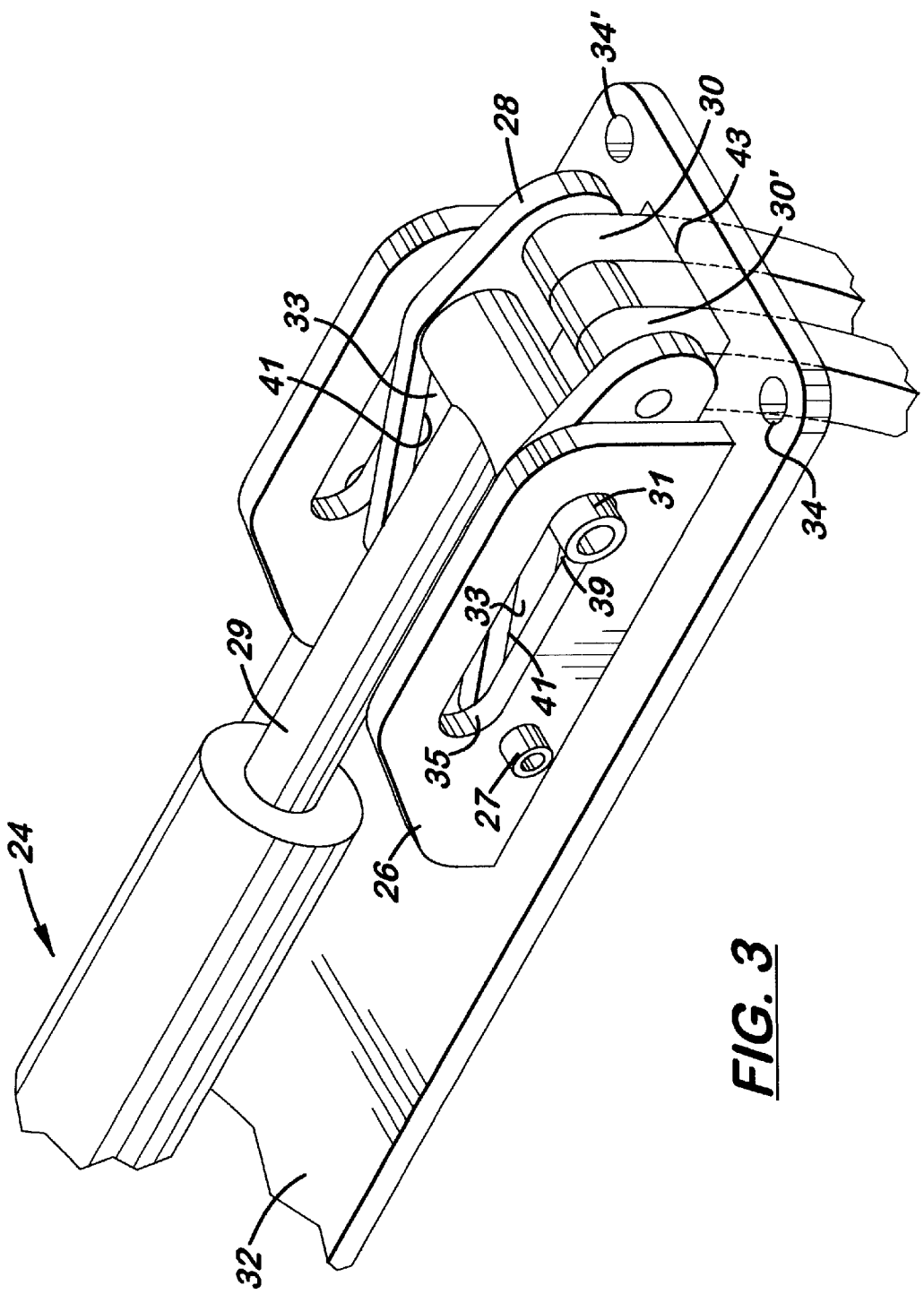
FIG. 3 is a schematic top partial perspective view of the extended actuator and set of two (2) extended prongs of an embodiment of the invention.

Referring to the Figures, there is shown one, but not the only, embodiment of the invented ski vehicle brake and steering system. FIG. 1 shows the prong 30 of the brake and steering system 10 retracted in the "go" position. FIG. 2 shows the prong 30 extended in the "stop" or "steer" position.

In FIG. 1 is depicted a schematic side view of one embodiment of the ski vehicle brake and steering system 10 of the invention. A ski runner 12 is attached to a suspension strut 14 of a ski vehicle, for example, a snowmobile (not shown). The attachment point of runner 12 to strut 14 is generally at steering pivot point 16. Runner 12 has front end 18 and rear end 20, and pivot point 16 is generally about mid-way between front end 18 and rear end 20.

Brake and steering system 10 includes motor or pump 22, threaded shaft or hydraulic ram system 24, securing bracket 26, pivotal member 28 and moveable prong 30. Motor or pump 22 is for driving threaded shaft or hydraulic system 24. Shaft or ram system 24 transfers the power from motor or pump 22 to pivotal member 28, by translating linear motion to rotation motion. Pivotal member 28 is secured on its proximal end to runner 12 by bracket 26, and is adapted to pivot on a horizontal axis 27 parallel to the top surface of the runner 12 and perpendicularly to the length of the runner 12. Two tabs 31 extend out from both sides of the distal end of the shaft 29, through slots 33 in the pivotal member 28, and into slots 35 in the bracket 26. Slots 35 lie on the same horizontal plane as the shaft 29, and slots 33 extend radially out from axis 27, which is below the horizontal plane of the shaft 29 and slots 35. This arrangement, therefore, places slots 33 and their bottom surface 39 and top surface 41 at an angle to the path of tabs 31. This, when the shaft moves the tabs 31 forward, tabs 31 push on the bottom surface 39 and force pivotal member 28 to rotate downward. In reverse, when shaft moves the tabs 31 rearward, the tabs 31 pull against the top surface 41 to force pivotal member 28 to rotate upward.

On its distal end, pivotal member 28 is secured to prong 30. This way, when motor or pump 22 is activated from the "go" to the "stop" or "steer" position, shaft or ram system 24 extends out and makes the pivotal member 28 rotate downwardly, which moves the distal end of pivotal member 28 downward in an arc to move prong 30 also downwardly. Thus, in the "stop" or "steer" position, the prong 30 extends below the plane of runner 12 and into the snow/ground. A typical runner 12 bottom surface 37 is recessed slightly relative to the edges 25 of the runner, and the prong 30 extends down between the edges up to about 6 inches below the plane of the edges. This way, the prong preferably is substantially below all parts of the runner 12, especially when fully extended in "stop" position.

When motor or pump 22 is activated from the "stop" or "steer" to the "go" position, ram system 24 retracts the shaft back in toward the rear of the runner, and makes the distal end of pivotal member 28 rotate upwardly, moving prong 30 also upwardly to retract up to above the plane of runner 12. Preferably, than, when the invented system is fully in the "go" condition, the prong 30 is raised fully so that the prong outer end is above the bottom surface of the runner 12.

In FIG. 3 is depicted a schematic top partial perspective view of an embodiment of the invention. A base plate 32 of brake and steering system 10 is provided for attachment to the top of runner 12, for example, at fastener holes 34 and 34'. The base plate 32 includes apertures 43 near its front edge for receiving a prong or prongs. Apertures 45 also extend through the ski runner 12 centrally between the runner's edges, and extending from top surface to bottom surface, which runner apertures serve as a path in which the prong(s) move. As shown in the schematic view of the bottom of a ski runner in FIG. 5, apertures 45 and prongs 30, 30' are located generally near the center of the ski runner, both as measured along the longitudinal axis between tip (front end 18) and rear end 20, and along the width from edge to edge 25. The runner apertures are preferably located in the range of 0.1–8 inches back from the location of the pivot point 16, and more preferably about 3–4 inches. In this embodiment, pivotal member 28 connects to a set of two spaced prongs 30, 30', which prongs are substantially identically shaped and which extend parallel to each other. The shaft or ram system 24 is shown in FIG. 3 in the extended position, and pivotal member 28 and prong set 30 and 30' are shown in the rotated down position, resulting in the "stop" or "steer" function.

While the Figures illustrate the invented brake and steering system either in the fully-retracted "go" position or the fully-extended "stop" or "steer" position, the inventors envision that many intermediate positions will be effective for gradual slowing or steering of the snowmobile. This is further illustrated by the following discussion of steering and control.

The brake and steering system 10 of the present invention is located near, but behind, the steering pivot point 16 of ski runner 12. In a conventional snowmobile, for example, the steering pivot point 16 is near the middle of the longitudinal axis of runner 12. Therefore, brake and steering system 10 is located behind pivot point 16 on runner 12. However, brake and steering system 10 is not at or near the rear end of runner 12, as in the Martin reference, U.S. Pat. No. 5,673,772. This way, the weight of brake and steering system 10 is behind but near the steering pivot point 16 of the runner 12, which greatly improves handling compared to any member that might be placed at the end of the runner 12. Also, the brake and steering system 10 is behind the pivot point 16, so that, when runner 12 is airborne over the snow/ground, the front end 18 of runner 12 is urges upwardly, permitting the snowmobile to handle properly.

A preferred feature is the steering enhancement provided by the invention. There are several features and options in the invented braking and steering system that contribute to this enhancement.

First, the preferred prongs 30, 30' are curved so that their distal ends point slightly rearward when fully extended. This curvature makes breaking and steering smooth as the prongs move in and out of the snow. The preferred prongs 30, 30' are elongated so that their width and depth are about the same, that is, preferably about 1 inch, and their length is about 7–10 inches. This way, each prong is a generally thin, narrow "spike" that stabs into the snow near the pivot point of the ski runner. This structure creates more precise and predictable steering and handling than would a blade or paddle urged against the snow, because it enhances the pivot point effect, by extending, in effect, the vertical pivot axis down into the snow. In this way, rather than solely relying on the friction of the bottom of the ski to grip the snow so that the ski runner may pivot around the pivot point and turn the snowmobile the ski runner tends to pivot around or near the prongs. Additionally, the prongs preferably do not have broad side surfaces and hence do not tend to provide significant sideways resistance in the snow, which would translate to resistance to turning. Rather, the invented prongs improve control and handling during turning.

Secondly, preferably the motor or pump 22 and shaft or ram system 24 are adapted to be incrementally actuated, so that prongs 30, 30' may be pivoted into the snow incrementally and gradually. For example, as illustrated schematically in FIG. 4, a lever handle 60, such as is conventionally used in the industry, may be installed on the handlebar 62 of the snowmobile and an appropriate control system responding to incremental movement of the lever handle may be added to the snowmobile. This way, the driver controls the amount of pivoting of the prongs 30, 30' by the amount of squeezing of the lever handle 60 against the handgrip 64 of the snowmobile. Preferably, two lever handles are used, one on the right side and one on the left side of the handlebars. The lever handles and associated control system may be adapted so that moving either one or two lever handles is required to control the prongs, but preferably only a right-hand brake lever controls when the brake and steering system is in the simultaneous mode. This way, a single lever controls the "singular" action of actuating all the prongs of both ski runners.

Third, independent "differential" control and preferably independent incremental control is provided for the braking and steering system located on each ski runner. By independently controlling the two systems, and by having the control for each ski runner being incremental, each brake and steering system may be slowed independently and to a desired amount, to improved steering and handling. With the preferred system, the braking and steering system of one ski runner may be applied to a greater extent, for example, at the same time the braking and steering system of the other runner is being "eased off" or completely released. For example, when 1) the right system is applied to a greater extent that the left system, or 2) the right system is applied but the left system is not applied at all, the right ski will slow more than the left and the left will tend to travel around the right ski, that is, the snowmobile will turn right. The control system for this differential mode involves the two variable controls, one on each of the right and left handlebars, that electrically or mechanically control the right and left ski runner prongs, respectively. Preferably, the variable controls comprises a lever handle on each handlebar that operate by conventional means of pulling a cable 61.

A preferred option is to add a control for switching between two modes of operation: 1) independent ("differential") control of the right and left ski's braking and steering system, and 2) simultaneous and substantially equal control. This may be done with a switch 66 located on either the right side or left side of the handlebars, in the middle, or other locations convenient for switching but not prone to accidental switching. By moving this switch to the simultaneous mode (S"), the system becomes substantially a braking system, while moving this switch to the differential ("D") mode, the system becomes better adapted for steering.

The control systems associated with the braking and steering system, including the differential steering feature, the incremental actuation feature, and the switching between differential and simultaneous modes, may be of conventional design.

The inventors envision that the means pump, motor or other mechanism for powering the invented system may be positioned elsewhere besides the top surface of the runner. In such embodiments, the shaft or other actuating device would be actuated by apparatus or power from a remote location.

The inventors also envision that a safety system may also be added, to immediately activate the brake and steering system into the "stop" position, when, for example, the driver leaves his seat. This could be done by a pressure-sensitive switch on the seat or other sensor for sensing the absence of the driver or a passenger.

Although this invention has been described above with reference to particular means, materials and embodiments, it is to be understood that the invention is not limited to these disclosed particulars, but extends instead to all equivalents within the scope of the following claims.

What is claimed is:

1. A ski vehicle braking and steering comprising:
 a first unit on a first ski runner and a second unit on a second ski runner, the first unit and second unit both comprising a baseplate for being received by the top surface of the respective ski runner, a moveable prong pivotally connected to the baseplate, the prong being extendable through said ski runner and pivoting into a raised position substantially above the ski runner top surface and into a lowered position extending below a bottom surface of the ski runner;
 a single control system incrementally pivoting the prong between the raised position and the lowered position for both the first unit and the second unit; and,
 wherein the single control system further comprises a differential mechanism for independently controlling the first unit separately from the second unit, so that the prong of the first unit may be pivoted to a different position betweem the raised position and the lowered position than the prong of the second unit.

2. A braking and steering system as in claim 1, wherein the single control system comprises a switch that switches the control system to a first mode using the differential mechanism, and to a second mode wherein both the first unit and the second unit are controlled simultaneously so that the prongs of the first unit and the second unit are simultaneously pivoted an equal amount.

3. A braking and steering system as in claim 1, wherein the first ski runner has a pivot-point for receiving a snowmobile suspension and steering mechanism, and wherein the first unit has a center of gravity located near and behind the pivot point.

4. A braking and steering system as in claim 1, wherein the second ski runner has a pivot point for receiving a snowmobile suspension and steering mechanism, and wherein the second unit has a center of gravity located near and behind said pivot point.

* * * * *